(12) United States Patent
Yang

(10) Patent No.: US 10,858,879 B2
(45) Date of Patent: Dec. 8, 2020

(54) COMPOSITE THERMAL INSULATOR

(71) Applicant: ZIRCO APPLIED MATERIALS CO., LTD., Taoyuan (TW)

(72) Inventor: Shiou-Sheng Yang, Taoyuan (TW)

(73) Assignee: Zirco Applied Materials Co., Ltd., Taoyuan (TW)

( * ) Notice: Subject to any disclaimer, the term of this patent is extended or adjusted under 35 U.S.C. 154(b) by 172 days.

(21) Appl. No.: 16/012,240

(22) Filed: Jun. 19, 2018

(65) Prior Publication Data

US 2019/0316409 A1     Oct. 17, 2019

(30) Foreign Application Priority Data

Apr. 13, 2018    (TW) .............................. 107112836 A

(51) Int. Cl.
*E06B 3/67*         (2006.01)
*B82Y 30/00*      (2011.01)
(Continued)

(52) U.S. Cl.
CPC ............ *E06B 3/6715* (2013.01); *B82Y 30/00* (2013.01); *C01G 41/02* (2013.01); *E06B 7/28* (2013.01); *B32B 7/12* (2013.01); *B32B 17/10036* (2013.01); *B32B 17/10449* (2013.01); *B32B 17/10633* (2013.01); *B32B 17/10752* (2013.01); *B32B 17/10788* (2013.01); *B32B 27/16* (2013.01); *B32B 27/306* (2013.01); *B32B 2250/05* (2013.01); *B32B 2250/40* (2013.01); *B32B 2264/102* (2013.01); *B32B 2307/304* (2013.01); *B32B 2307/412* (2013.01);
(Continued)

(58) Field of Classification Search
CPC .......... G02B 5/28; G02B 5/285; G02B 5/223; G02B 5/208; G02B 5/0833; G02B 1/115; G02B 1/116; E06B 3/67; E06B 3/6715; E06B 7/28; B82Y 30/00; C01G 41/02; B32B 7/12; B32B 27/36; B32B 27/16; B32B 27/306; B32B 17/10752; B32B 17/10633; B32B 17/10036; B32B 17/10449; B32B 17/10788; B32B 2250/05; B32B 2250/40; B32B 2264/102; B32B 2307/412; B32B 2307/304; B32B 2307/71; B32B 2310/0831; B32B 2329/06; B32B 2333/08; C01P 2006/60; C01P 2004/64
USPC ................ 359/359, 350, 584–586, 589, 590; 428/426, 430, 212, 415, 332
See application file for complete search history.

(56) References Cited

U.S. PATENT DOCUMENTS

| 2015/0168618 | A1* | 6/2015 | Nakajima | G02B 1/04 |
| | | | | 359/359 |
| 2015/0192718 | A1* | 7/2015 | Saito | G02B 5/208 |
| | | | | 359/359 |
| 2015/0362627 | A1* | 12/2015 | Yang | G02B 1/04 |
| | | | | 252/587 |

FOREIGN PATENT DOCUMENTS

CN            101784386 A     7/2010

* cited by examiner

*Primary Examiner* — Jie Lei
(74) *Attorney, Agent, or Firm* — Muncy, Geissler, Olds & Lowe, P.C.

(57) ABSTRACT

The present invention discloses a composite thermal insulator including a first transparent substrate layer, a second transparent substrate layer, and a near-infrared shielding layer positioned between the first transparent substrate layer and the second transparent substrate layer, and the near-infrared shielding layer is formed by dispersively fixing multiple nanoparticles containing tungsten oxide in polyethylene terephthalate. The composite thermal insulator can't (Continued)

change color under sunlight so that it can be used for light output controlling and thermal isolation.

1 Claim, 2 Drawing Sheets

(51) Int. Cl.
  *C01G 41/02*  (2006.01)
  *E06B 7/28*  (2006.01)
  *B32B 7/12*  (2006.01)
  *B32B 17/10*  (2006.01)
  *B32B 27/16*  (2006.01)
  *B32B 27/30*  (2006.01)
(52) U.S. Cl.
  CPC ... *B32B 2307/71* (2013.01); *B32B 2310/0831* (2013.01); *B32B 2329/06* (2013.01); *B32B 2333/08* (2013.01); *C01P 2004/64* (2013.01); *C01P 2006/60* (2013.01)

COMPOSITE THERMAL INSULATOR

FIELD OF THE INVENTION

The present invention is related to a thermal insulator, and more particularly to a composite thermal insulator having a near-infrared light shielding layer.

BACKGROUND OF THE INVENTION

A laminated glass article is made by sandwiching a thermoplastic resin layer in between two glass substrates. Since the thermoplastic resin layer is tough and viscous, the laminated glass article can't be penetrated under hit and its scraps resulted from break can't be scattered. That is, the type of the glass article has a higher shock resistance, an anti-theft property, an explosion-proof property, and a bullet-proof property than other types.

In a laminated glass article, a functional additive may be added to the thermoplastic resin layer to change function. For example, the thermoplastic resin layer may has a function of blocking infrared light from sunlight to save power consumed by an air conditioner and to provide a comfortable living environment.

In order to block infrared light from sunlight, the prior study finds that tungsten oxide is insulated against heat. However, tungsten oxide is so active under ultraviolet of sunlight that its valence electrons transfer leading to color change. For such reason, the traditional laminated glass article has inconvenience of being used.

Tungsten suboxide, tungsten trioxide, and tungsten bronze can isolate heat. Generally, after such tungsten compound is mixed with organic resins, the mixture has a property of thermal insulation under sunlight. However, organic resins may be decomposed into electrons and protons, and the electrons and the protons may be reacted with the tungsten compound to darken the tungsten compound. Taking tungsten trioxide for example, the reaction is represented by the following: $WO_3$ (transparent)$+xH^++xe^- \rightarrow H_xWO_3$ (dark blue). Because of such phenomenon, the tungsten compound can't exhibit the properties of thermal insulation and light output controlling so as to lower its application in thermal insulation-related field.

In a prior method for manufacturing a laminated thermal insulation glass article, endothermic/thermal insulation filters containing tungsten compounds are added to polyvinyl butyral resins or ethylene vinyl acetate resins, or coated to a polyvinyl butyral film or an ethylene vinyl acetate film. After which, the mixture is sandwiched in between two glass substrates through an adhesive. In this method, a light stabilizer or a light inhibitor is used to extend life span of the filters.

According to China Invention Patent Application No. 200880101701.7, a sandwich multilayer glass article is disclosed, which includes a polymer layer having tungsten oxide and molecule with a benzotriazole group. Although this article can be insulated against heat, it may darken under sunlight for a long term. Therefore, this article can't control light output to limit application value thereof.

In other methods, an endothermic/thermal insulation filter particle containing a tungsten compound may be coated with silicon dioxide.

According to J. Mater. Chem. C, 2015, 3, 8050-8060, Xianzhe Zeng and his colleague(s) disclose a coating layer made by coating a $Cs_xWO_3$ nanoparticle with $SiO_2$. Although this coating layer has properties of thermal insulation and non-sensitivity to light, the coating procedure is complicated to limit application value thereof.

In other methods, magnesium salt is used as a stabilizer, which leads to environmental problem and high cost problem resulted from a complicated procedure for coating an endothermic/thermal insulation filter containing a tungsten compound.

Therefore, it is desirable to improve a thermal insulator containing a tungsten compound.

SUMMARY OF THE INVENTION

An objective of the present invention is to provide a thermal insulator, which can't change color after long term light irradiation so that it is favorable for thermal insulation and light output controlling.

Another objective of the present invention is to provide a thermal insulator, which can overcome color change resulted from valence electron transfer in the tungsten oxide of a thermal insulating layer after ultraviolet irradiation of sunlight.

A further objective of the present invention is to provide a thermal insulator, which is not favorable for color change after sunlight irradiation.

A still further objective of the present invention is to provide a thermal insulator, which can absorb infrared light and withstand a weathering process. Therefore, this thermal insulator can control light output to be used as a window for building, agriculture, or transportation, a curtain wall, or a skylight and to prevent infrared light from being transmitted indoor.

Still another objective of the present invention is to provide a thermal insulator, where an endothermic/thermal insulation filter containing a tungsten compound is directly added to a polyethylene terephthalate layer patented by the present applicant. Therefore, the color change drawback of the endothermic/thermal insulation filter containing a tungsten compound under ultraviolet light can be overcome.

Yet another objective of the present invention is to provide a thermal insulator, where two pure polyethylene terephthalate layers and a thermal insulation polyethylene terephthalate layer are co-extruded to form a three-layer structure. Therefore, this thermal insulator can be manufactured through a simple, rapid, and industry applicable method.

Therefore, the present invention discloses a composite thermal insulator including a first transparent substrate layer, a second transparent substrate layer, and a near-infrared shielding layer positioned between the first transparent substrate layer and the second transparent substrate layer, and the near-infrared shielding layer is formed by dispersively fixing multiple nanoparticles containing tungsten oxide in polyethylene terephthalate.

In an embodiment, the composite thermal insulator further includes a first adhesive layer positioned between the first transparent substrate layer and the near-infrared shielding layer, and a second adhesive layer positioned between the second transparent substrate layer and the near-infrared shielding layer.

In an embodiment, the composite thermal insulator further includes a first protection layer positioned between the first transparent substrate layer and the near-infrared shielding layer, and a second protection layer positioned between the second transparent substrate layer and the near-infrared shielding layer.

In an embodiment, the first transparent substrate layer is a glass layer, a polycarbonate layer, or a polymethyl methacrylate layer, and the second transparent substrate layer is a glass layer, a polycarbonate layer, or a polymethyl methacrylate layer.

In an embodiment, the first adhesive layer is a polyvinyl butyral film, an ethylene vinyl acetate film, or a polyurethane film, and the second adhesive layer is a polyvinyl butyral film, an ethylene vinyl acetate film, or a polyurethane film.

In an embodiment, the first protection layer is a polyethylene terephthalate layer, and the second protection layer is a polyethylene terephthalate layer.

In an embodiment, the near-infrared shielding layer, the first protection layer, and the second protection layer are formed together through a co-extrusion process.

In an embodiment, the polyethylene terephthalate of the near-infrared shielding layer has an amount of 80%-99.99% by weight based on total weight of the near-infrared shielding layer, and the nanoparticles thereof have an amount of 0.01%-20% by weight based on total weight of the near-infrared shielding layer.

In an embodiment, the nanoparticles are dispersively fixed in the polyethylene terephthalate in an amount of 0.01-10 g/m² of the polyethylene terephthalate.

In an embodiment, the nanoparticles are nanoparticles containing tungsten suboxide, nanoparticles containing tungsten trioxide, or nanoparticles containing tungsten bronze; tungsten suboxide is represented by a formula of $WO_x$, W indicates a tungsten atom, O indicates an oxygen atom, x indicates a number of the oxygen atom, and $2.2 \leq x < 3$; tungsten bronze is represented by a formula of $A_yWO_z$, A indicates a main-group atom, W indicates a tungsten atom, O indicates an oxygen atom, y indicates a number of the main-group atom, $0.1 \leq y < 1$, z indicates a number of the oxygen atom, and $2.2 \leq z < 3$.

In an embodiment, the main-group atom is a lithium atom, a sodium atom, a potassium atom, a rubidium atom, a cesium atom, a magnesium atom, a calcium atom, a strontium atom, a barium atom, an aluminum atom, a gallium atom, a carbon atom, a silicon atom, a tin atom, an antimony atom, a fluorine atom, a chlorine atom, a bromine atom, or an iodine atom.

In an embodiment, tungsten suboxide is represented by a formula of $WO_{2.72}$.

In an embodiment, tungsten bronze is represented by a formula of $Cs_{0.33}WO_3$.

In an embodiment, the near-infrared shielding layer has a thickness of 1-1,000 μm.

In an embodiment, the near-infrared shielding layer has a thickness of 12-250 μm.

In an embodiment, each nanoparticle has a particle size of 1-800 nm.

In an embodiment, the first adhesive layer has a thickness of 0.38-1.52 mm, and the second adhesive layer has a thickness of 0.38-1.52 mm.

In an embodiment, the composite thermal insulator is substantially transparent after being irradiated with ultraviolet light having a wavelength of 310 nm and an intensity of 0.63 W/m² for 8 hours, being condensed by water at 50° C. for 4 hour, and then being treated with repeated cycles of the ultraviolet light irradiation and water condensation for more than 500 hours.

In an embodiment, the composite thermal insulator has a color change ratio of less than 1% after being irradiated with ultraviolet light having a wavelength of 310 nm and an intensity of 0.63 W/m² for 8 hours, being condensed by water at 50° C. for 4 hour, and then being treated with repeated cycles of the ultraviolet light irradiation and water condensation for more than 500 hours.

According to the present invention, polyethylene terephthalate can prevent tungsten oxide from reaction with electrons and protons so that the color of the composite thermal insulator can't change. By such a manner, based on the thermal insulation of tungsten oxide, the composite thermal insulator still can exhibit light output controlling to enhance its industrial value.

DETAILED DESCRIPTION OF THE INVENTION

Other features and advantages of the invention will become apparent in the following detailed description of a preferred embodiment with reference to the accompanying drawings.

Figure 1:
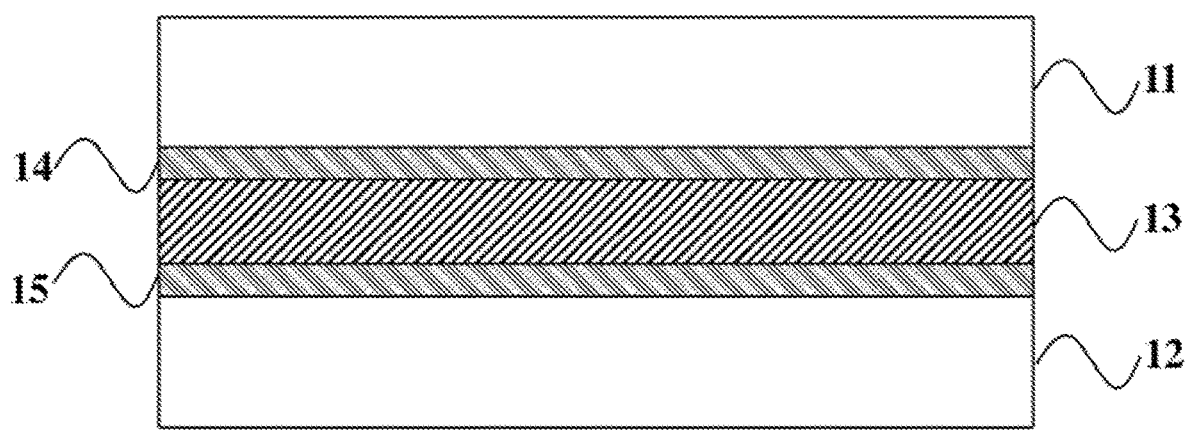
FIG. 1 is a section view illustrating a composite thermal insulator according to a first embodiment.

As shown in FIG. 1, a composite thermal insulator according to a first embodiment of the present invention is depicted. This composite thermal insulator has properties of heat isolation and color stability so as to be used for thermal insulation and light output controlling. The composite thermal insulator at least includes a first transparent substrate layer (11), a second transparent substrate layer (12), a near-infrared shielding layer (13), a first adhesive layer (14), and a second adhesive layer (15).

The first transparent substrate layer (11) and the second transparent substrate layer (12) are structurally supportive to the composite thermal insulator, and they may individually be a glass layer, a polycarbonate layer, or a polymethyl methacrylate layer. In addition, the first transparent substrate layer (11) and the second transparent substrate layer (12) may individually have a thickness of 2-19 mm.

The near-infrared shielding layer (13) is positioned between the first transparent substrate layer (11) and the second transparent substrate layer (12) and is formed by dispersively fixing multiple nanoparticles containing tungsten oxide in polyethylene terephthalate. Polyethylene terephthalate can prevent tungsten oxide from reaction with electrons and protons so that the composite thermal insulator can isolate heat without color change. The near-infrared shielding layer (13) may have a thickness of 12-250 μm, and preferably of 18-100 μm. Based on total weight of the near-infrared shielding layer (13), the nanoparticles may have an amount of 0.01 wt %-20 wt %, and the polyethylene terephthalate may have an amount of 80 wt %-99.99 wt %. Additionally, the nanoparticles may be dispersively fixed in the polyethylene terephthalate in an amount of 0.01-10 g/m² of the polyethylene terephthalate. Further, an example of the nanoparticle is a nanoparticle containing tungsten suboxide, tungsten trioxide, or tungsten bronze. Tungsten suboxide is represented by a formula of $WO_x$, wherein W indicates a tungsten atom, O indicates an oxygen atom, x indicates a number of the oxygen atom, and $2.2 \leq x < 3$. Tungsten bronze is represented by a formula of $A_yWO_z$, wherein A indicates a main-group atom (for example, a lithium atom, a sodium atom, a potassium atom, a rubidium atom, a cesium atom, a magnesium atom, a calcium atom, a strontium atom, a barium atom, an aluminum atom, a gallium atom, a carbon atom, a silicon atom, a tin atom, an antimony atom, a fluorine atom, a chlorine atom, a bromine atom, or an iodine atom), W indicates a tungsten atom, O indicates an oxygen atom, y indicates a number of the main-group atom, $0.1 \leq y < 1$, z indicates a number of the oxygen atom, and $2.2 \leq z < 3$.

The first adhesive layer (14) is positioned between the first transparent substrate layer (11) and the near-infrared shielding layer (13) and can provide adhesion on the first transparent substrate layer (11) for the near-infrared shielding layer (13). The first adhesive layer (14) may have a thickness of 0.38-0.76 mm, and an example thereof is a polyvinyl butyral film, an ethylene vinyl acetate film, or a polyurethane film. It is noted that polyvinyl butyral not only can enhance the adhesion ability, but also has properties of heat proof, chill proof, humidity proof, and high mechanical strength so as to increase application value of the composite thermal insulator.

The second adhesive layer (15) is positioned between the second transparent substrate layer (12) and the near-infrared shielding layer (13). It is noted technical features and functions of the second adhesive layer (15) refer to the previous description for the first adhesive layer (14), and there is no further description thereon.

Figure 2:
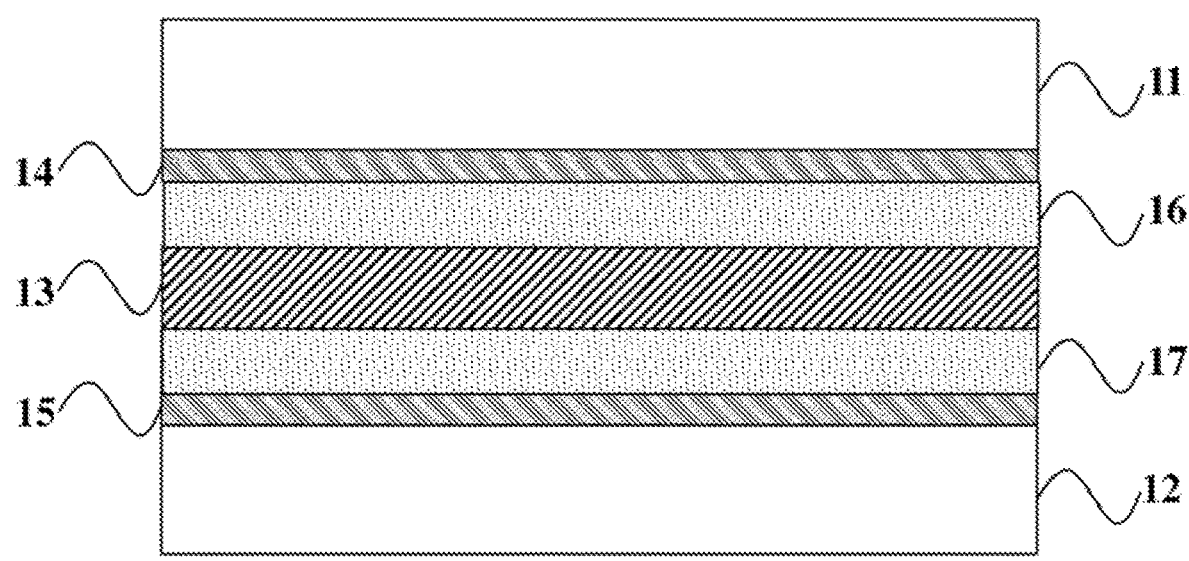
FIG. 2 is a section view illustrating a composite thermal insulator according to a second embodiment.

As shown in FIG. 2, a composite thermal insulator according to a second embodiment of the present invention is depicted. The present composite thermal insulator substantially has the same technical features and functions as those of the previous composite thermal insulator, but their differences are described as below:

Between the first transparent substrate layer (11) and the near-infrared shielding layer (13) is a first protection layer (16), and between the second transparent substrate layer (12) and the near-infrared shielding layer (13) is a second protection layer (17). These protection layers (16, 17) can ensure no contact of electrons and protons with the nanoparticles containing tungsten oxide so that the oxidation-reduction reaction can't take place. By such a way, the color stability can be ensured. Specifically, the first protection layer (16) is positioned between the first adhesive layer (14) and the near-infrared shielding layer (13), and the second protection layer (17) is positioned between the second adhesive layer (15) and the near-infrared shielding layer (13). Examples of the first protection layer (16) and the second protection layer (17) are individually a polyethylene terephthalate layer. The polyethylene terephthalate layer can bring benefit that it can be formed with the near-infrared shielding layer (13) through a co-extrusion process to simplify the manufacturing process.

The following examples are offered to further illustrate the invention:

Any near-infrared shielding layers described in the following examples were made by the present inventor(s), and the manufacture referred to Taiwan Invention Patent Application No. 103120233; any polyvinyl butyral films and any ethylene vinyl acetate films described in the following examples were commercially available from Solutia, Trosifol, Sekesui, Dupont, Kingboard Chemical Holdings, Formosa Plastics, or Tex Year; any glass substrates described in the following examples were commercially available from Taiwanglass or AGC. Table 1 shows the structural compositions of various thermal insulators, and all layers are stacked in sequence.

TABLE 1 composition and optical property of various thermal insulators

| | Composition | Transmittance (%) |
|---|---|---|
| Example 1 | Glass substrate with a depth of 2 mm/ Polyvinyl butyral film with a depth of 0.38 mm/Near-infrared shielding layer with a depth of 18 μm (containing $WO_{2.72}$ nanoparticles)/Polyvinyl butyral film with a depth of 0.38 mm/ Glass substrate with a depth of 2 mm | 0.2 |
| Example 2 | Glass substrate with a depth of 3 mm/ Ethylene vinyl acetate film with a depth of 0.38 mm/Near-infrared shielding layer with a depth of 18 μm (containing $WO_{2.72}$ nanoparticles)/ Ethylene vinyl acetate film with a depth of 0.38 mm/Glass substrate with a depth of 2 mm | 0.1 |
| Example 3 | Glass substrate with a depth of 5 mm/ Polyvinyl butyral film with a depth of 0.38 mm/Near-infrared shielding layer with a depth of 23 μm (containing $Cs_{0.33}WO_3$ nanoparticles)/ Polyvinyl butyral film with a depth of 0.38 mm/Glass substrate with a depth of 5 mm | 0.3 |
| Example 4 | Glass substrate with a depth of 6 mm/ Ethylene vinyl acetate film with a depth of 0.38 mm/Near-infrared shielding layer with a depth of 23 μm (containing $WO_{2.72}$ nanoparticles)/ Ethylene vinyl acetate film with a depth of 0.38 mm/Glass substrate with a depth of 6 mm | 0.4 |
| Example 5 | Glass substrate with a depth of 10 mm/ Polyvinyl butyral film with a depth of 0.76 mm/Near-infrared shielding layer with a depth of 50 μm (containing $Cs_{0.33}WO_3$ nanoparticles)/Polyvinyl butyral film with a depth of 0.76 mm/ Glass substrate with a depth of 10 mm | 0.5 |
| Example 6 | Glass substrate with a depth of 12 mm/ Ethylene vinyl acetate film with a depth of 1.14 mm/Near-infrared shielding layer with a depth of 50 μm (containing $Cs_{0.33}WO_3$ nanoparticles)/ Ethylene vinyl acetate film with a depth of 1.14 mm/Glass substrate with a depth of 12 mm | 0.4 |
| Example 7 | Glass substrate with a depth of 15 mm/ Polyvinyl butyral film with a depth of 1.52 mm/Near-infrared shielding layer with a depth of 100 μm (containing $Cs_{0.33}WO_3$ nanoparticles)/Polyvinyl butyral film with a depth of 1.52 mm/ Glass substrate with a depth of 15 mm | 0.8 |
| Example 8 | Glass substrate with a depth of 19 mm/ Ethylene vinyl acetate film with a depth of 1.52 mm/Near-infrared shielding layer with a depth of 188 μm (containing $Cs_{0.33}WO_3$ nanoparticles)/ Ethylene vinyl acetate film with a depth of 1.52 mm/Glass substrate with a depth of 19 mm | 0.6 |
| Comparative Example 1 | Glass substrate with a depth of 5 mm/ Polyvinyl butyral film with a depth of 0.76 mm (containing 0.2 wt % of $Cs_{0.33}WO_3$ nanoparticles)/Glass substrate with a depth of 5 mm | 27.3 |
| Comparative Example 2 | Glass substrate with a depth of 6 mm/ Ethylene vinyl acetate film with a depth of 0.76 mm (containing 0.2 wt % of $WO_{2.72}$ nanoparticles)/Glass substrate with a depth of 6 mm | 36.8 |

All thermal insulators were test for transmittance after being irradiated with ultraviolet light having a wavelength of 310 nm and an intensity of 0.63 W/m² for 8 hours, being condensed by water at 50° C. for 4 hour, and then being treated with repeated cycles of the ultraviolet light irradiation and water condensation for more than 500 hours. The test result is shown in Table 1. Compared with the thermal insulators in comparative examples, the thermal insulators in examples have no color change and are substantially transparent.

As described above, the thermal insulator of the present invention can't change color under sunlight. That is, it is a thermal insulator for light output controlling and can be used in any substances in need of thermal isolation.

While the invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A method for making composite thermal insulator, having a color change ratio of less than 1% transparent, comprising:

providing a first transparent substrate layer, a second transparent substrate layer;

co-extruding and providing a near-infrared shielding layer which is positioned between the first transparent substrate layer and the second transparent substrate layer and formed by dispersively fixing multiple nanoparticles containing tungsten oxide in polyethylene terephthalate, a first protection layer which is positioned between the first transparent substrate layer and the near-infrared shielding layer, and a second protection layer which is positioned between the second transparent substrate layer and the near-infrared shielding layer, wherein the first protection layer is a pure polyethylene terephthalate layer, and the second protection layer is a pure polyethylene terephthalate layer;

irradiating with ultraviolet light having a wavelength of 310 nm and an intensity of 0.63 W/m² for 8 hours;

condensing by water at 50° C. for 4 hour; and treating with repeated cycles of the ultraviolet light irradiation and water condensation for more than 500 hours.

* * * * *